Oct. 10, 1939.          A. E. KRICK ET AL          2,175,471

DRILL HEAD

Filed Jan. 7, 1937

INVENTORS
ARTHUR E. KRICK and
WILLIAM CARLETON STARKEY,
BY

ATTORNEYS

Patented Oct. 10, 1939

2,175,471

UNITED STATES PATENT OFFICE 2,175,471

DRILL HEAD

Arthur E. Krick and William C. Starkey, Indianapolis, Ind., assignors to L. G. S. Devices Corporation, Indianapolis, Ind., a corporation of Indiana Application January 7, 1937, Serial No. 119,377

4 Claims. (Cl. 255—71)

Our invention relates to drill-heads of the roller-cutter type, and particularly to roller-cutter heads the cutters of which are provided with anti-friction bearings. Anti-friction bearings have been used for the cutters of drill-heads; but, in practice, all anti-friction bearings of which we are aware have certain disadvantages which it is the object of this invention to overcome.

Among the more specific objects of our invention are to improve the construction of radial bearings of the roller type as used in association with the cutters of a drill head, whereby better alinement of the rollers is maintained and friction and wear are reduced; to provide an improved ball thrust bearing the balls of which will be retained in place in their associated cutter when the cutter is removed from the drill head; and to provide an improved means for retaining in place in the head a shaft on which certain of the cutters are mounted.

In carrying out our invention, we confine the rollers of the radial bearings against axial movement by means which act to retain the rollers in parallelism with the cutter axis. The race of each thrust bearing is formed as an annular groove in the end face of each cutter, such groove having an opening narrower than the diameter of the balls, the balls being placed in the race through a passage which extends axially through the cutter and which is closed by suitable means after all the balls have been inserted. The cross-shaft, on which some of the cutters are mounted is secured against movement axially of itself by having a bayonet-lock mounting in the head.

Figure 1:
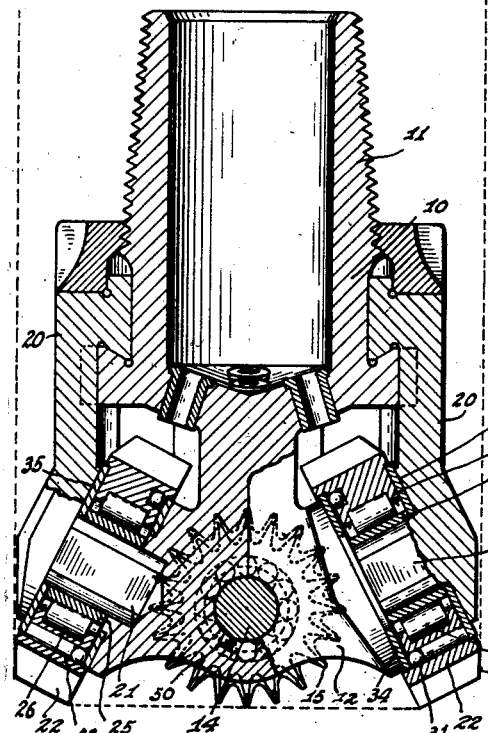
Figure 2:
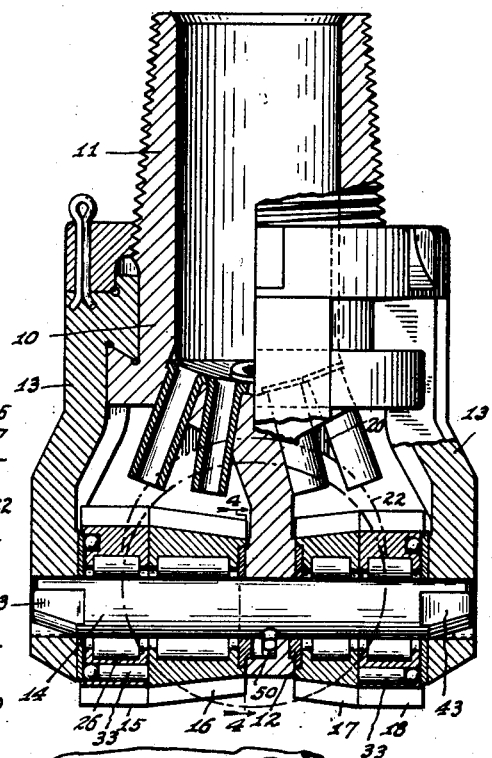
Figure 3:
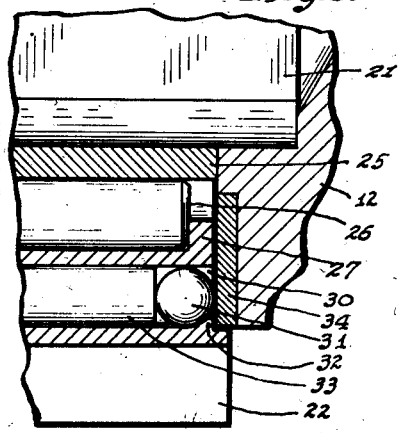
Figure 4:
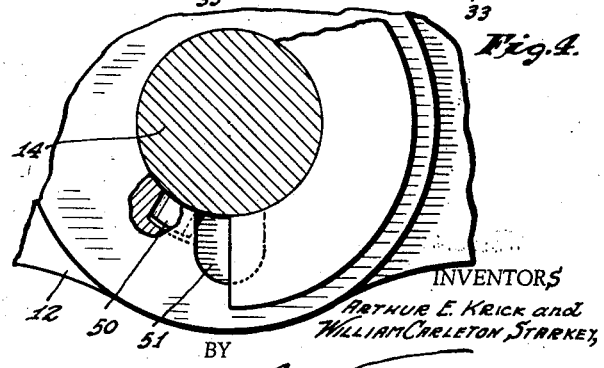

The accompanying drawing illustrates our invention: Figs. 1 and 2 are axial sections in different planes through a drill-head embodying our invention; Fig. 3 is a fragmental section similar to Fig. 1, but on an enlarged scale; and Fig. 4 is a fragmental section on the line 4—4 of Fig. 2.

The drill-head illustrated in the drawing is described in greater particularity in United States Patent No. 2,049,047, which issued July 28, 1936, to D. T. Brownlee. It comprises a body 10 provided at its upper end with a screw-threaded boss 11, adapted for connection to the drill pipe, and at its lower end with a downwardly extending web 12. Secured to the body at diametrically opposite points are two downwardly extending arms 13 which support the outer ends of a cross shaft 14 that extends between them through a hole in the web 12. The shaft 14 serves as a support for the cross-cutters four of which, indicated at 15, 16, 17, and 18, are shown in the drawing.

Another pair of arms 20 are mounted in diametrically opposite relation to the head-body 10. These arms extend downwardly and are provided respectively at their lower ends with downwardly and inwardly inclined spindles 21 which serve as supports for the side cutters 22. The inner ends of the spindles 21 are received in suitable openings in the web 12 and derive support therefrom.

As indicated in the drawing, each of the four cross-cutters and each of the two side cutters is provided with an anti-friction radial bearing of the roller type. In the case of the side cutters 22, each of the associated spindles 21 is provided with a removable sleeve or inner race 25 upon which the rollers 26 run. In the case of the cross cutters, the rollers 26 are shown as directly engaging the cross-shaft, which acts as the inner race of the bearing.

In each bearing, the rollers 26 are held in place axially of themselves by annular flanges 27 rigid with the associated cutter. These flanges serve to prevent any engagement of the ends of the rollers with any stationary part and have, on the rollers, an action different from any stationary collar or roller-retaining flange.

It is almost inevitable that during the operation of the head the rollers will be displaced from parallelism with the cutter-axis and will, as a result, tend to work axially one way or the other until they engage something which limits their axial movement. Any cylindrical roller tends to roll in a direction perpendicular to itself. If the roller is not in parallelism with the cutter-axis, it will tend to follow a helical path with one end lagging the other in the direction of cutter rotation, and movement along this helical path will continue until the lagging end of the cutter engages some abutment. If that abutment is stationary, as has been the case in all prior drill-heads of which we are aware, the abutment imposes a frictional drag upon the lagging end of the roller and tends to throw it even further out of parallelism with the cutter-axis. As a result, a wedging action is created which greatly increases the resistance to cutter-rotation and causes accelerated wear.

By confining the rollers against axial movement through the medium of the flanges 27 which we provide on the cutters, we are enabled to overcome this disadvantage. The rollers have an angular velocity about the cutter-axis which is considerably less than the angular velocity of the cutter. When a lagging end of a roller 26 engages one of the flanges 27, that flange is moving more rapidly than is the roller and, instead of tending to retard the already lagging roller-end, the flange tends to accelerate it and restore it to proper parallel relation with the cutter-axis. Desirably, the ends of the rollers 26 are made convex, as by chamfering, and the inner face of each flange 27 plane, so as to insure that their interengagement will take place at points spaced inwardly from the surface of the bore of the cutter, where the difference in velocities about the cutter-axis is greater than it is at points nearer the surface of the cutter-bore.

As previously indicated, the thrust bearings which we employ are ball bearings. In the case of the side cutters 22, the thrust bearings act between the cutters and the web 12 to transmit the generally horizontal thrust which is exerted upon the side cutters by the walls of the hole. In the case of the cross cutters, however, the thrust bearings are provided between each of the outer cutters 15 and 18 and its associated cross-shaft supporting arm 13 to take the outwardly directed thrust which results from the rotation of the cutter head.

The construction of each thrust bearing is perhaps best illustrated in Fig. 3, which shows the arrangement of the thrust bearing of one of the side cutters 22. The inner face of the side cutter is provided with an annular groove 30 which, while wide enough for the greater part of its depth to receive the balls 31, has an opening whose width is less than the ball-diameter. The race is conveniently formed by cutting a parallel-walled groove of a width somewhat less than the diameter of the balls and then undercutting one wall to leave a ball-retaining flange 32.

For the purpose of inserting the balls in the ball-race, the cutter 22 is provided with a hole which extends generally axially of the cutter from the bottom of the ball-race 30 to the opposite face of the cutter. The balls are fed successively through this hole until the race is filled; and then a plug 33 is inserted in the hole to prevent the balls from escaping. The plug 33 is held in place in the cutter in any convenient manner, as by having a drive fit, by welding its outer end to the cutter-body, or by both.

To provide a suitable surface for the balls 31 to roll upon, the web 12 of the drill-head is faced for the reception of a bearing washer 34, which is conveniently formed of hardened steel. A similar washer 35 may be employed between each of the cutters 22 and its associated arm 20. To impede the ingress of foreign matter into the bearings, each end face of the cutter 22 may be counterbored for the reception of the associated thrust washer 34 or 35.

As is evident from Fig. 1, the outer edge of each of the side cutters 22 is chamfered, as indicated at 40, at an angle complementary to that of the inclination of the associated spindles 21. As a result of this chamfering, the cutter 22 engages the side wall of the hole being drilled over a considerable vertical extent. It is within the vertical limits of this extent that inward pressure is applied to each of the side cutters by the surrounding earth. In order to minimize as far as possible any tendency of such inward earth pressure to cock the cutter 22 upon its axis, we make the ball race 30 of such diameter that, at its bottom, it lies between the upper and lower limits of the area over which the cutter engages the side wall of the hole being drilled.

Desirably, each of the ball-retaining plugs 33 terminates flush with the outer face of the associated cutter 22 so that when the head is assembled the outer thrust-washer 35 will prevent the plug 33 from being dislodged.

The ball thrust-bearing 41 which transmits axial thrust between each of the outer cross cutters and its associated arm 13 is similar in construction to the ball thrust bearing with which each of the cutters 22 is provided. The ball race is formed as a groove in the outer face of the cross cutter, the race is filled by inserting the balls through an axial hole in the cutter, and the hole is subsequently closed by the plug 33.

To retain the cross shaft 14 in position, we may use the expedient illustrated in Figs. 2 and 4. As indicated in those figures of the drawing, the cross-shaft 14 is provided intermediately with an outwardly projecting lug or pin 50. The web 12 has a hole for the reception of the cross shaft 14, and for a short distance inwardly from one face of the web 12 there is cut in the wall of the shaft-receiving hole an axially extending groove 51 large enough to pass the lug or pin 50. At its inner end, the groove 51 is provided with a circumferentially extending extension which is also large enough to receive the pin 50 and into which the pin 50 can be moved by rotation of the shaft 14 to hold the shaft in fixed axial position.

For the purpose of preventing rotation of the shaft 14 from locked position, those portions of the shaft-ends which are received in the supporting arms 13 are flattened, as indicated at 43, and the shaft-receiving holes in the arms 13 are made of similar shape so that rotation of the shaft is impossible when the arms 13 are in place.

In assembling the cross-shaft 14 and its associated cutters and supporting arms 13 in the head, the shaft 14 is first put in place in the web 12 and rotated to bring the pin 50 into the groove-extension, thus locating the shaft in fixed axial position. Thereafter, the cross-cutters, with their associated bearings, thrust-washers, etc., are placed on the shaft 14, and the arms 13 are then secured in position. The flattened areas 43 at the ends of the cross shaft prevent any rotation of the shaft in the arms 13; and, since the shaft 14 can not be moved axially until it is rotated to bring the pin 50 into alignment with the groove 51, the whole assembly is locked together.

We claim as our invention:

1. In a rotary well-drilling head, a rotary cutter, said cutter being provided in one end-face with an annular groove, an annular series of balls in said groove, said groove having a depth less than the diameter of said balls whereby said balls will project beyond the adjacent portions of the end face of the cutter, an annular flange integral with said cutter and projecting radially into said groove to retain said balls in place therein, said cutter having a ball admission passage which communicates with said groove and which extends through said cutter, and means for closing said passage to retain said balls in place in said groove.

2. In a rotary well-drilling head, a rotary cutter, said cutter being provided in one end-face with an annular groove, an annular series of balls in said groove, said groove having a depth less than the diameter of said balls whereby said balls will project beyond the adjacent portions of the end face of the cutter, an annular flange integral with said cutter and projecting radially into said groove to retain said balls in place therein, said cutter having a ball admission passage which communicates with said groove and which extends through said cutter, and a ball-retaining plug disposed in said passage, said body having means for preventing escape of said plug.

3. In a drill head, a body having a transversely disposed opening, a shaft in said opening, one or more rotary cutters on said shaft, said shaft being provided with a laterally extending lug, the wall of said opening being provided with a lug-receiving groove extending axially inwardly from one end of said opening and having at its inner end a circumferentially extending extension, and releasable means for holding said shaft against rotation with said lug in place in said groove-extension.

4. In a drill-head, a body, a transverse cutter-shaft, a shaft-support on said body having an opening for the reception of an intermediate portion of said shaft, a laterally projecting lug on said shaft, the wall of said opening being provided with a lug-receiving groove extending axially inwardly from one end of said opening and having at its inner end a circumferentially extending extension, and a removable support for one end of said shaft, said support and shaft having co-operating provisions for preventing rotation of said shaft from one position in which said lug is disposed in said groove-extension.

ARTHUR E. KRICK.
WILLIAM C. STARKEY.